(12) United States Patent
Siminoff

(10) Patent No.: US 9,734,675 B2
(45) Date of Patent: Aug. 15, 2017

(54) WIRELESS COMMUNICATION USB DONGLE

(71) Applicant: BOT HOME AUTOMATION, INC., Santa Monica, CA (US)

(72) Inventor: James Siminoff, Pacific Palisades, CA (US)

(73) Assignee: BOT Home Automation, Inc., Santa Monica, CA (US)

( * ) Notice: Subject to any disclaimer, the term of this patent is extended or adjusted under 35 U.S.C. 154(b) by 0 days.

(21) Appl. No.: 14/905,653

(22) PCT Filed: Jul. 17, 2014

(86) PCT No.: PCT/US2014/046952
§ 371 (c)(1),
(2) Date: Jan. 15, 2016

(87) PCT Pub. No.: WO2015/009890
PCT Pub. Date: Jan. 22, 2015

(65) Prior Publication Data
US 2016/0163163 A1    Jun. 9, 2016

Related U.S. Application Data

(60) Provisional application No. 61/847,274, filed on Jul. 17, 2013.

(51) Int. Cl.
*G08B 5/36* (2006.01)
*G08B 3/10* (2006.01)
(Continued)

(52) U.S. Cl.
CPC ............... *G08B 3/10* (2013.01); *G08B 5/36* (2013.01); *G08C 17/02* (2013.01); *H04M 11/025* (2013.01)

(58) Field of Classification Search
CPC .. G08B 15/002; G08B 3/10; G08B 13/19684; G08B 25/10; H04M 11/025;
(Continued)

(56) References Cited

U.S. PATENT DOCUMENTS 3,740,737 A * 6/1973 Carleson ............. G08B 15/002
340/309.4
3,886,352 A * 5/1975 Lai .......................... H05B 37/02
250/215
(Continued)

FOREIGN PATENT DOCUMENTS

| CN | 102915630 A | 2/2013 |
|---|---|---|
| CN | 203596064 U | 5/2014 |

OTHER PUBLICATIONS

U.S. Appl. No. 15/217,741, filed Jul. 22, 2016; First Named Inventor: James Siminoff. Non Final Rejection dated Mar. 2, 2017 (13 pages).
(Continued)

*Primary Examiner* — Fekadeselassie Girma
(74) *Attorney, Agent, or Firm* — White and Williams LLP

(57) ABSTRACT

A communication device that may be removably coupled to a USB port, the device having a processor and non-volatile memory and configured to execute code, including code for receiving a wireless transmission including an alert signal from a second device, where the second device is a wireless doorbell, code for sounding an alarm via an audio or visual indicator on the communication device in response to the alert signal, code for receiving input from a user and transmitting a response signal to the second device, and code for allowing two-way audio communication between the communication device and the wireless doorbell.

9 Claims, 7 Drawing Sheets

(51) Int. Cl.
*H04M 11/02* (2006.01)
*G08C 17/02* (2006.01)

(58) Field of Classification Search
CPC .. H04M 11/00; H04M 1/0291; H04M 1/7253; H04M 1/72536; H04M 2250/12; H04N 7/186; H04N 5/33; H04N 7/185; H04N 7/188; G07C 9/00
See application file for complete search history.

(56) References Cited

U.S. PATENT DOCUMENTS

| | | | | |
|---|---|---|---|---|
| 4,764,953 | A * | 8/1988 | Chern | H04M 11/025 379/102.06 |
| 5,886,631 | A * | 3/1999 | Ralph | G08B 15/002 340/541 |
| 6,763,226 | B1 * | 7/2004 | McZeal, Jr. | H04B 7/18595 370/354 |
| 7,683,800 | B2 * | 3/2010 | Ortiz | G08B 15/002 340/307 |
| 8,058,976 | B2 * | 11/2011 | Ortiz | G08B 15/002 340/328 |
| 8,164,614 | B2 | 4/2012 | Carter | |
| 8,823,795 | B1 | 9/2014 | Scalisi et al. | |
| 2003/0043047 | A1 * | 3/2003 | Braun | G08B 3/10 340/691.1 |
| 2003/0080855 | A1 * | 5/2003 | Koneff | G08B 3/10 340/328 |
| 2006/0025074 | A1 * | 2/2006 | Liang | H04M 1/05 455/41.2 |
| 2006/0038663 | A1 * | 2/2006 | Steinetz | G08B 3/10 340/392.1 |
| 2009/0172214 | A1 * | 7/2009 | McGowan | G06F 13/385 710/29 |
| 2009/0205582 | A1 * | 8/2009 | Kitchens | A01M 29/18 119/719 |
| 2010/0169531 | A1 * | 7/2010 | Bae | G06F 1/1632 710/303 |
| 2010/0225455 | A1 | 9/2010 | Claiborne | |
| 2010/0302025 | A1 | 12/2010 | Script | |
| 2011/0050164 | A1 * | 3/2011 | Partovi | H01F 5/003 320/108 |
| 2013/0049954 | A1 * | 2/2013 | Scannell | H04W 68/00 340/539.11 |
| 2013/0057695 | A1 * | 3/2013 | Huisking | H04N 7/186 348/156 |
| 2013/0193776 | A1 * | 8/2013 | Tanaka | H04W 52/0261 307/326 |
| 2014/0016103 | A1 * | 1/2014 | Reichenbach | G02B 27/0093 353/62 |
| 2014/0098227 | A1 | 4/2014 | Chen et al. | |
| 2015/0022618 | A1 | 1/2015 | Simonoff | |
| 2015/0223355 | A1 * | 8/2015 | Fleck | G06F 1/163 361/679.03 |
| 2015/0341603 | A1 * | 11/2015 | Kasmir | H04N 5/33 348/143 |
| 2016/0191864 | A1 * | 6/2016 | Siminoff | H04N 7/186 348/155 |
| 2016/0258202 | A1 * | 9/2016 | Scalisi | G07C 9/00309 |
| 2016/0337614 | A1 * | 11/2016 | Siminoff | H04N 7/148 |
| 2016/0366373 | A1 * | 12/2016 | Siminoff | H04N 7/186 |

OTHER PUBLICATIONS

U.S. Appl. No. 15/150,387, filed May 9, 2016; Firm Named Inventor: James Siminoff. Non Final Rejection dated Feb. 1, 2017 (13 pages).
EBAY, Wireless WiFi Door Phone Doorbell Remote Music Box Indoor Home Security, Jan. 31, 2016, USA (16 pages).
jd.com, Asdibuy Smart WiFi Doorbell with Indoor Ding Dong Receiver IB-DB104 (14 pages).
European Patent Application No. 14826268.6, Filing Date Jul. 14, 2014. Extended European Search Report (EESR) dated Mar. 16, 2017 (8 pages).

* cited by examiner

WIRELESS COMMUNICATION USB DONGLE

CROSS REFERENCE

This application is a National Stage of International Application No. PCT/US2014/046952, filed Jul. 17, 2014, which claims the benefit of earlier filed U.S. Provisional Application No. 61/847,274, filed on Jul. 17, 2013, both of which are incorporated by reference herein in their entirety.

BACKGROUND OF THE INVENTION

Recent advancements in intercom technology and the rapid development of microcomputer industry have allowed users to access numerous household functions remotely. Specifically there are various types of Wireless Doorbell Chimes available in the market that may be accessed from multiple access points such as portable interfaces and smart devices etc. In addition to the advancement of intercom technology, wireless communication chips may be packaged into a smaller configurations, saving space without affecting their processing ability. As building upon the aforesaid advancements we have developed a USB Doorbell Dongle that not only can store data but also it may work as a USB wireless Controller for a wireless doorbell chime.

SUMMARY OF THE INVENTION

A communication device that may be removably coupled to a USB port, the device having a processor and non-volatile memory and configured to execute code, including code for receiving an alert signal from a second device, where the second device is a wireless doorbell, code for sounding an alarm via an audio or visual indicator on the communication device in response to the alert signal, and code for receiving input from a user and transmitting a response signal to the second device.

DETAILED DESCRIPTION

Figure 1:
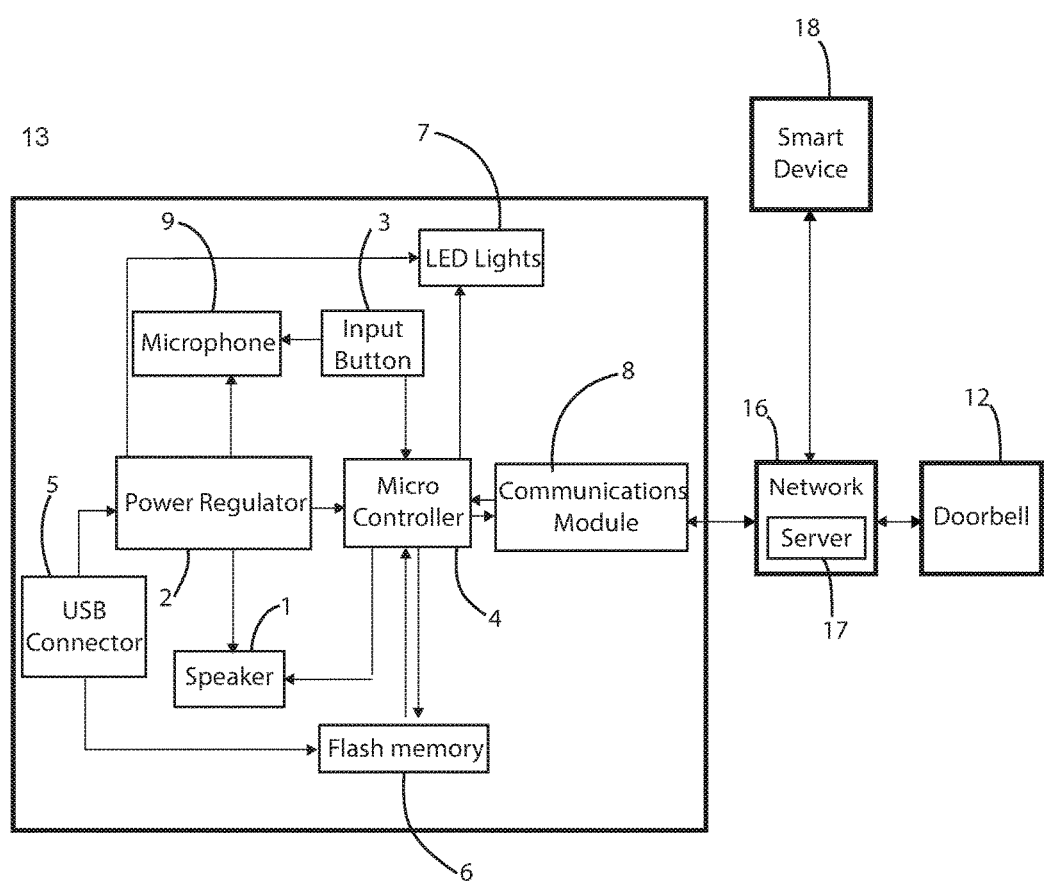
FIG. 1 is an Entity Relationship diagram of the system and components of USB Doorbell Dongle according to an aspect of the present disclosure.

FIG. 1 is an Entity Relationship Diagram displaying the components of USB Doorbell Dongle 13 according to an aspect of present disclosure. USB Doorbell Dongle 13 may be an electronic hardware device designed to fit into a USB port. As shown in FIG. 1, USB Doorbell Dongle 13 contains Microcontroller 4, Flash Memory 6, Speaker 1, LED Lights 7 and Communications Module 8. Each component inside USB Doorbell Dongle 13 performs an individual function which then contributes to an efficient working of the whole system. USB Doorbell Dongle 13 may communicate directly or indirectly with Doorbell 12. Doorbell 12 may be a doorbell capable of wireless data transmission. Doorbell 12 may be equipped with a microphone, speaker, camera and button. Doorbell 12 may act as an intercom system, which in turn relays digital audio and/or video to USB Doorbell Dongle 13 and Smart Device 18, allowing a User and a Visitor to communicate remotely with each other.

Smart Device 18 may be any electronic device capable of receiving and transmitting data via the Internet, capable of transmitting and receiving audio and video communications, and that can operate to some extent autonomously. Examples of Smart Device 18 are but not limited to smartphones, tablets, laptops, computers, and VOIP telephone systems. In one non-limiting aspect, Smart Device 18 may be an initial point of contact between a Visitor (not shown) at Doorbell 12 and a User (not shown), prior to Doorbell 12 connecting to USB Doorbell Dongle 13. In this aspect, in the event that the User cannot connect to Doorbell 12 via Smart Device 18, data routed by Server 17 may be directed to USB Doorbell Dongle 13.

In one aspect, USB Doorbell Dongle 13, Smart Device 18 and Doorbell 12 communicate via Wi-Fi. In this aspect, Communications Module 8 may be an off the shelf component such as the GS2011M module by Gainspan, or it could be another module that adds low power, high speed Wi-Fi and Internet connectivity to a device with a microcontroller and serial host interface. Communications Module 8 may send outbound data calls to Server 17 via Network 16, containing data such as sound and identifying information related to USB Doorbell Dongle 13. Network 16 may be a telecommunications network that allows computers to exchange data either physically or virtually. Server 17 determines which USB Doorbell Dongle 13 is associated with Doorbell 12 using the identifying information sent and routes the transmitted signal through Server 17 to USB Doorbell Dongle 13. Server 17 is a system that responds to requests across a computer network to provide, or help to provide, a network service, such as routing. The Doorbell 13 may connect to Network 16 via Communications Module 8 to communicate with USB Doorbell Dongle 13.

Other data transmission protocols such as bluetooth or zigbee may be incorporated into Communications Module 8 to transmit data to mobile devices or any other device capable of receiving wireless data transmissions. In this aspect, data may be transmitted to Microcontroller 4 directly through Bluetooth protocol via Communications Module 8 depending on Doorbell Dongle's 13 proximity to Doorbell 12.

Once a wireless connection has been made, Microcontroller 4 may process data delivered from Doorbell 12 to USB Doorbell Dongle 13. Microcontroller 4 is a self-contained processing system embedded in USB Doorbell Dongle 13 which handles and distributes commands coming in and out of the device and routes them to the appropriate components. If Doorbell 12 is rung by a Visitor, Microcontroller 4 may transmit a notifying signal to a User via USB Doorbell Dongle 13, such as activating LED Lights 7 and/or emitting an audio ringtone through Speaker 1. USB Doorbell Dongle 13 may be equipped with one or more Input Buttons 3. When pressed by the User, Input Button 3 may activate Microphone 9 to allow the User to communicate with the Visitor through audio transmission.

Figure 4A:
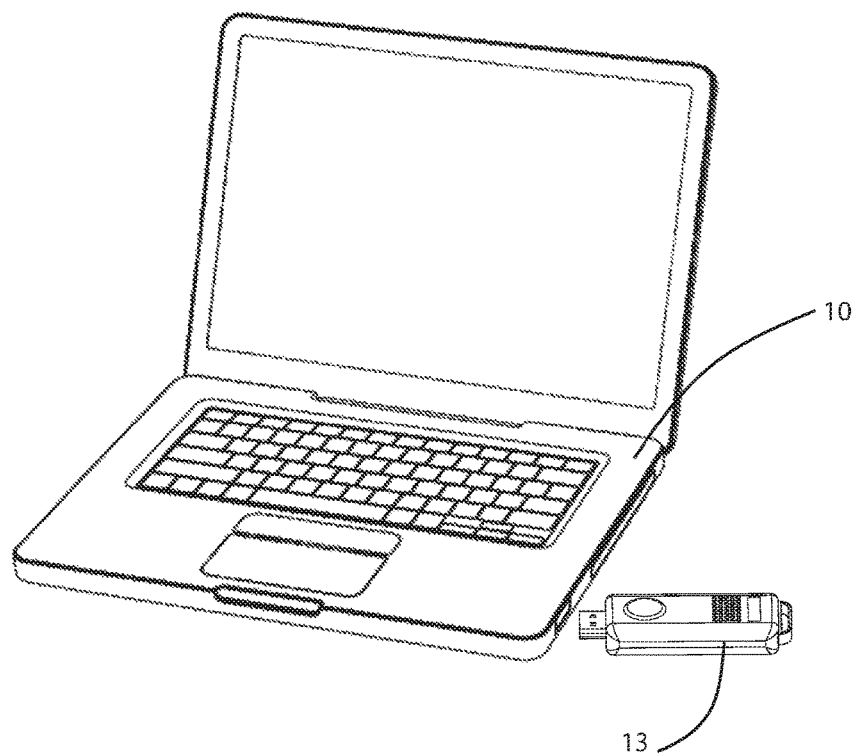
FIG. 4A is a front profile view of USB Doorbell Dongle being inserted into a computer according to an aspect of present disclosure.
Figure 4B:
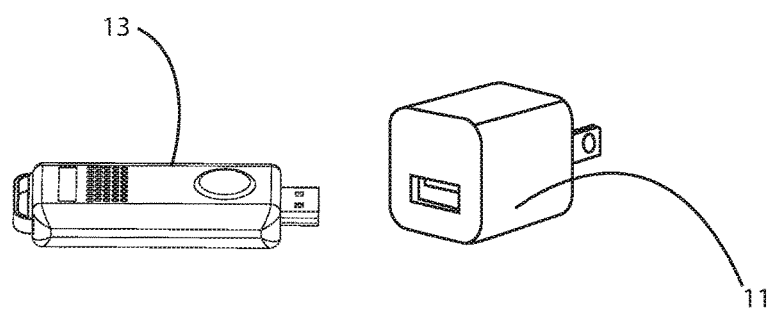
FIG. 4B is a front profile view of USB Doorbell Dongle being inserted in USB Adapter according to an aspect of present disclosure.

USB Connector 5 may transmit data and/or electrical current from Computer 10 (FIG. 4A) and USB Wall Adapter 11 (FIG. 4B). Electrical current is transmitted to Power Regulator 2, which in turn distributes power to all components within USB Doorbell Dongle 13. Any data transmitted via USB Connector 5 from Computer 10 may be stored in Flash Memory 6. In one aspect of the present disclosure, a User may store audio ringtones on Flash Memory 6, which may be emitted when Doorbell 12 is rung.

Figure 2:
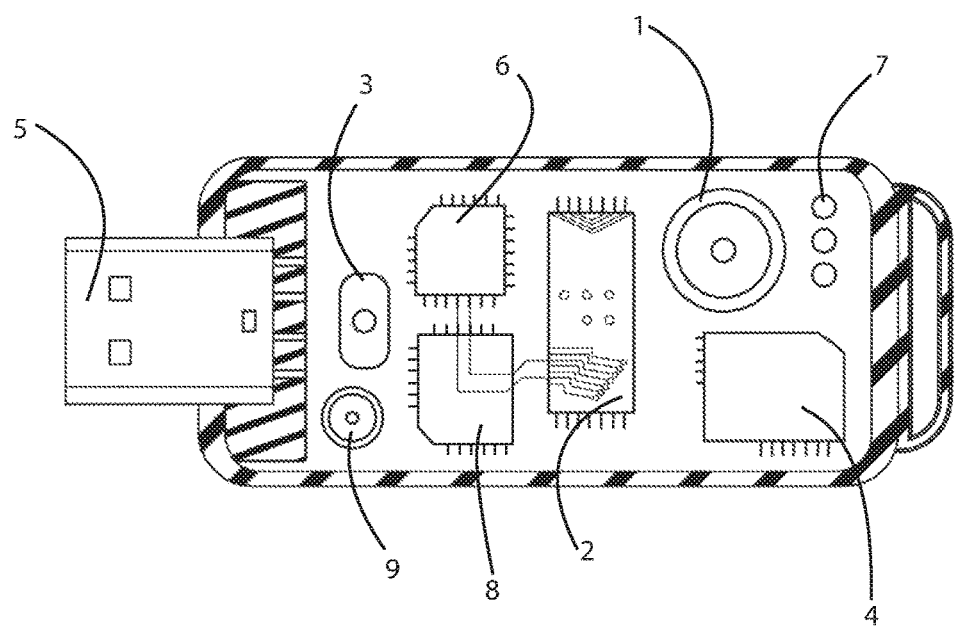
FIG. 2 is a cross sectional view of USB Doorbell Dongle according to an aspect of present disclosure.

FIG. 2 shows a cross sectional view of USB Doorbell Dongle 13 according to an aspect of present disclosure. USB Doorbell Dongle 13 may contain Flash Memory 6 in conjunction with Speaker 1, Power Regulator 2, Input Button 3, Microcontroller 4, USB Connector 5, LED Lights 7, Communications Module 8 and Microphone 9. Flash Memory 6 embedded inside USB Doorbell Dongle 13 may be used to store or transfer the User's data from one device to another device such as Computer 10. Flash Memory 6 may also be used to store potential ringtones that the User might select as an audio notification for Doorbell 12. Communications Module 8 may contain Bluetooth and/or Wi-Fi, and connect to Doorbell 12 depending on the wireless connection available at that given time. In one aspect of the present disclosure, USB Doorbell Dongle 13 may have the ability to extended available Wi-Fi signal to the nearby devices available within Network 16. In this aspect, USB Doorbell Dongle 13 may contain components, (e.g. found in a Wi-Fi router) capable of receiving a wireless signal transmitted from Network 16, amplifying the wireless signal, and then transmitting the boosted signal throughout the User's location or facility. USB Doorbell Dongle 13 may include a battery (not shown) to allow operation when electrical power is not available to the device.

Figure 3:
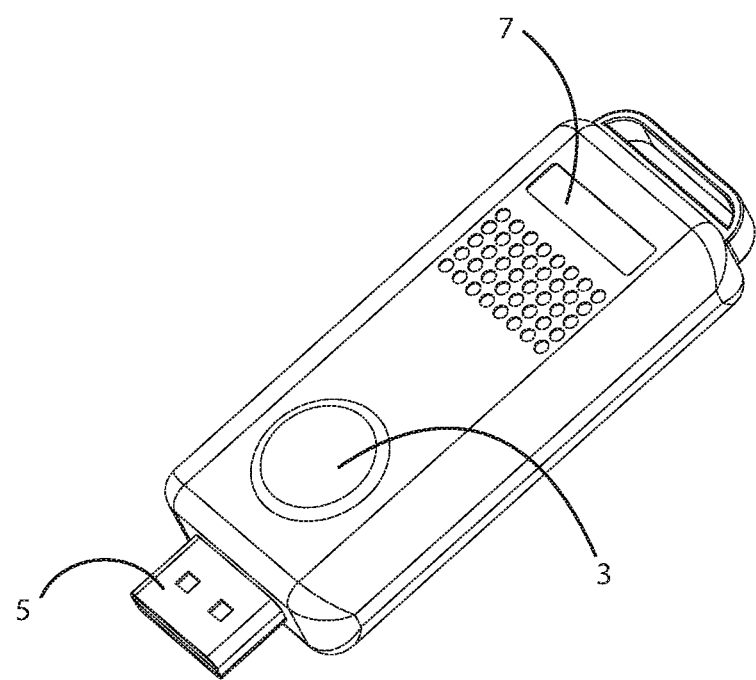
FIG. 3 is a front perspective view of USB Doorbell Dongle according to an aspect of present disclosure.

FIG. 3 shows a front perspective of USB DoorBell Dongle 13 according to an aspect of present disclosure. The top face of USB Doorbell Dongle 13 may feature a perforated pattern that allows for audio to be emitted from Speaker 9 (not shown). An aperture to allow for LED Lights 7 to emit light may be located on a front facing surface of USB Doorbell Dongle 13. LED Lights 7, mounted within USB Doorbell Dongle 13 may turn on and off or blink continuously depending on the signal transmitted from Doorbell 12. LED Lights 7 may also be illuminated if USB Doorbell Dongle 13 is plugged into Computer 10 or USB Wall Adapter 11. In this aspect, the illumination of LED Lights 7 may indicate charging or data transfer and may turn off once the user unplugs USB Doorbell Dongle 13 from Computer 10 or USB Wall Adapter 11.

Input button 3 may be positioned on a front facing surface of USB Doorbell Dongle 13. Once USB Doorbell Dongle 13 receives signal from Doorbell 12, Microcontroller 4 is triggered to inform the User by emitting audio from Speaker 1 and/or illuminating LED Lights 7. The User may press Input button 3 to activate Microphone 9 in order to transmit digital audio from USB Doorbell Dongle 13 to Doorbell 12.

FIG. 4A shows a front profile view of USB Doorbell Dongle 13 being inserted into Computer 10 according to an aspect of present disclosure. USB Doorbell Dongle 13 may extract power from Computer 10 as USB Doorbell Dongle 13 may be plugged in the USB port of Computer 10. As USB Doorbell Dongle 13 may be inserted in Computer 10, the User may also extract data from Computer 10 and store on Flash Memory 6 embedded in USB Doorbell Dongle 13 and/or user may be able to transfer data back and forth from Computer 10 to USB Doorbell Dongle 13.

FIG. 4B shows USB Doorbell Dongle 13 being inserted in USB Wall Adapter 11 according to an aspect of present disclosure. USB Doorbell Dongle 13 may extract power from USB Wall Adapter 11 that may be plugged in a wall socket. USB Doorbell Dongle 13 may be inserted into any device offering a USB port, and that will also provide power to USB Doorbell Dongle 13.

Figure 5:
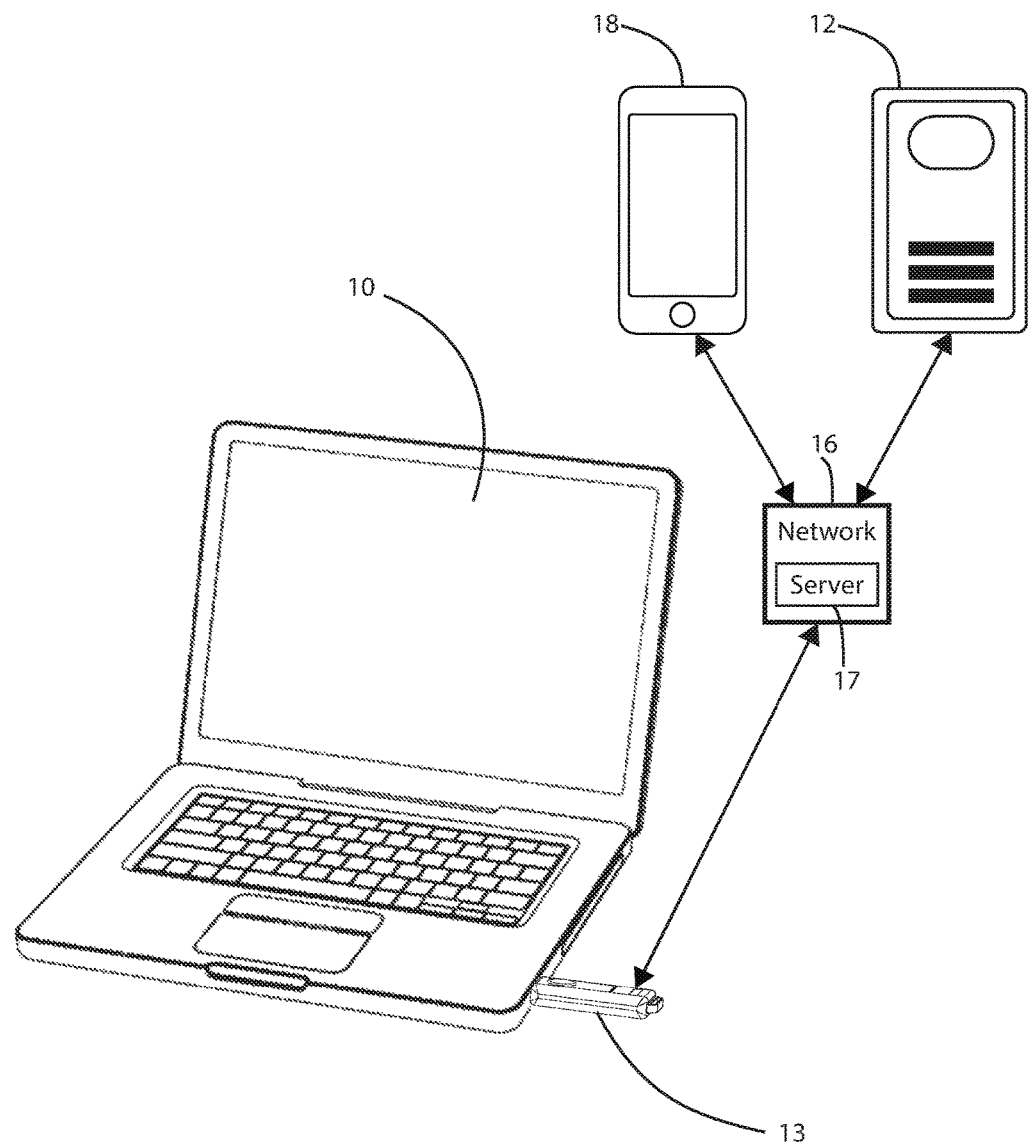
FIG. 5 shows a diagram displaying communication between components within the system according to an aspect of present disclosure.

FIG. 5 shows a diagram displaying communication between USB Doorbell Dongle 13 and Wi-Fi Doorbell 12. In one aspect of the present disclosure, when a notification command is transmitted from Doorbell 12 to USB Doorbell Dongle 13 through Wi-Fi or Bluetooth, the User may have the ability to talk to a Visitor through Microphone 9 embedded in the USB Doorbell Dongle 13.

In one aspect, USB Doorbell Dongle 13 may communicate with Doorbell 12 via Wi-Fi. Communication Module 8 may send an outbound data call to Server 17 located within Network 16, containing data such as sound and identifying information related to USB Doorbell Dongle 13. Server 17 may then determine which USB Doorbell Dongle 13 is associated with Doorbell 12 using the identifying information delivered from Doorbell 12 and may route the transmitted signal through Network 16 to USB Doorbell Dongle 13. As mentioned above, the connection may also transmit through bluetooth protocol via bluetooth module embedded in Communications Module 8 of USB Doorbell Dongle 13 depending on its proximity to Doorbell 12.

Figure 6:
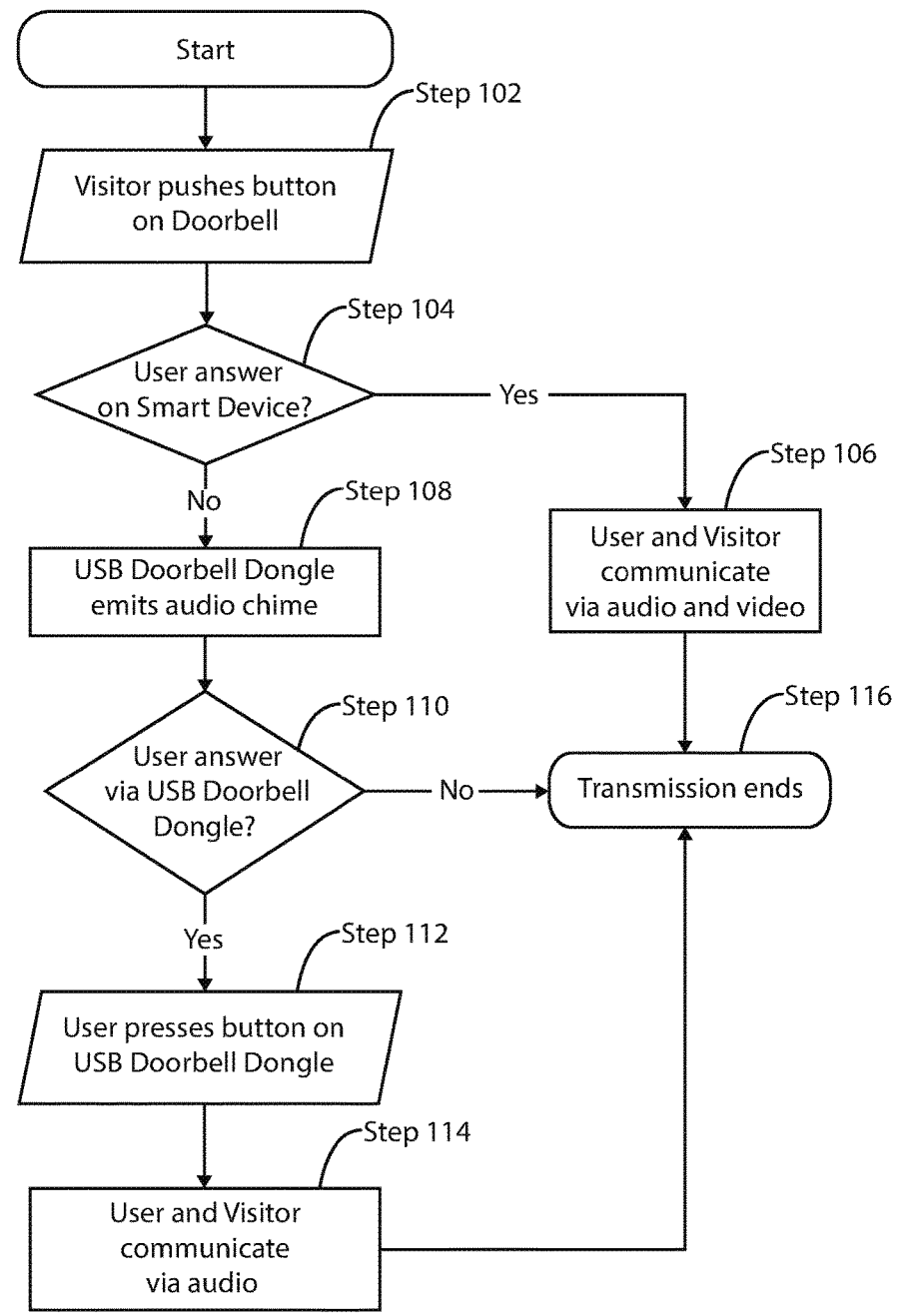
FIG. 6 is a process flow diagram regarding the use and functions associated with USB Doorbell Dongle according to an aspect of the present disclosure.

FIG. 6 displays a process flow regarding the use and functions associated with USB Doorbell Dongle 13 according to an aspect of the present disclosure. A Visitor may push a button located on the Doorbell 12 at Step 102. At Step 104, Doorbell 12 transmits data to Network 16 such as video, audio and identifying information associated to Doorbell 12. Server 17 identifies what Smart Devices 54, web based applications, USB Doorbell Dongle 13's and other devices may be associated with Doorbell 12. Server 53 may route the appropriate data, such as audio or video data, to the appropriate device based on the functions of each device. The User may initially receive a notification on Smart Device 18 or another device associated with Doorbell 12. If the request is accepted, (Yes, Step 104), the User and Visitor may communicate via audio and video transmissions sent to and from Doorbell 12 at Step 106. The transmission may then be terminated at Step 116 once the User disconnects or hangs up.

If a connection cannot be made with Smart Device 18, (No, Step 104), Server 17 routes data to USB Doorbell Dongle 13 at Step 108 to emit an audio chime. Reasons such as but not limited to poor network connection, Smart Device 18 not connected to a network, and Smart Device 18 being powered off may trigger USB Doorbell Dongle to emit an audio chime to the User.

If the User is in the presence of USB Doorbell Dongle 12 and is capable of answering the request, (Yes, Step 110), the User may press Button 3 located on USB Doorbell Dongle 12 at Step 112. Pressing Button 3 located on USB Doorbell Dongle 12 creates a connection between Doorbell 12 and USB Doorbell Dongle 12 via Network 16. The User and a Visitor may communicate via audio transmissions sent to and from Doorbell 12 and USB Doorbell Dongle 12 at Step 114. The transmission may then be terminated at Step 116 when the User disconnects by pressing Button 3.

If the User is not in the presence of USB Doorbell Dongle 12, or USB Doorbell Dongle 12 is either disconnected from Network 16 or powered off (No, Step 110) the transmission may then be terminated at Step 116. It may be understood by those skilled in the art that the steps described within FIG. 6 may take place in a different order than described above. For example, Server 17 may route data to USB Doorbell Dongle 12 prior to routing data to Smart Device 18.

Figure 7:
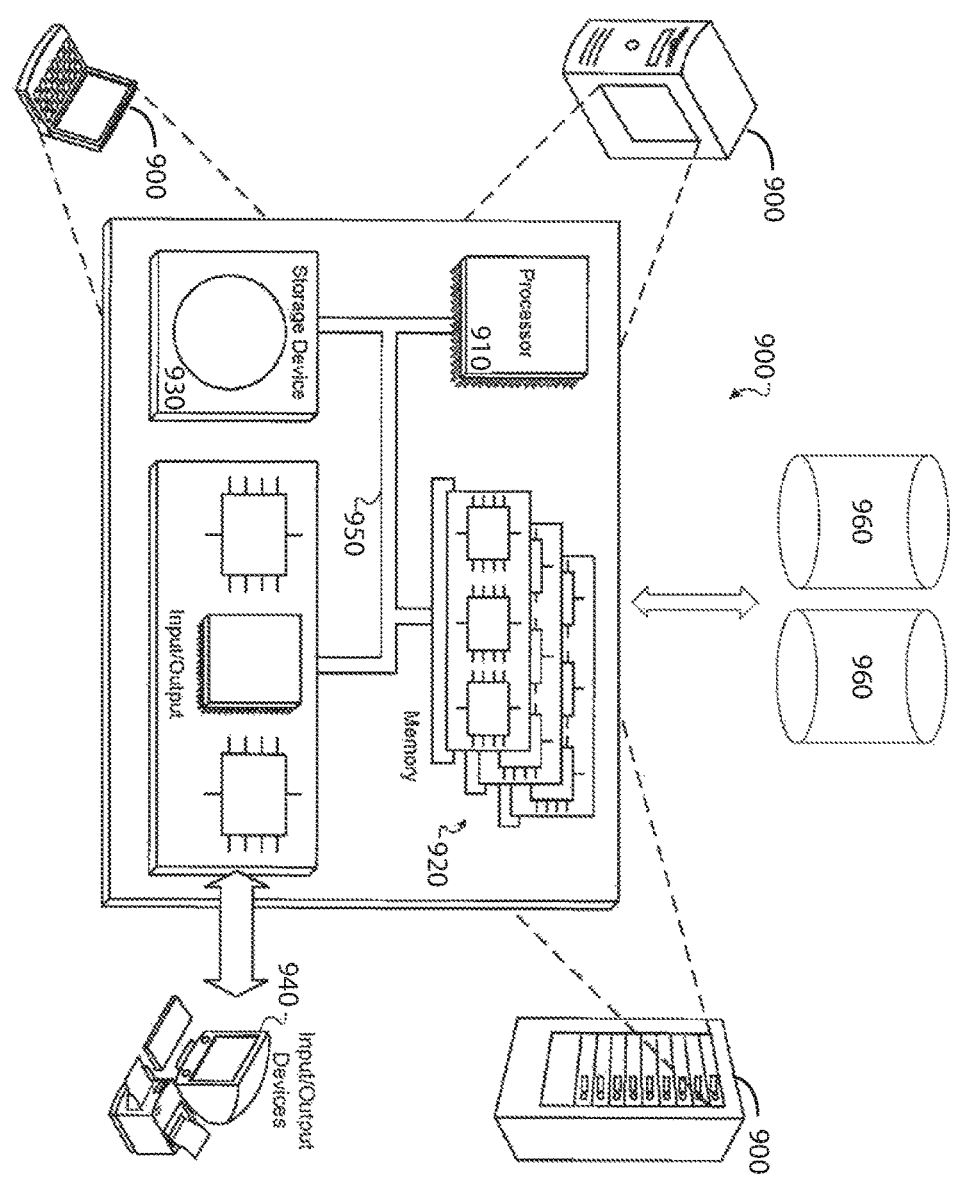
FIG. 7 is a diagram displaying a general purpose computer on which the system and method of the present disclosure may be implemented according to an aspect of present disclosure.

FIG. 7 shows a general purpose computer on which the system and method of the present disclosure may be implemented. The computer system 900 may execute at least some of the operations described above. Computer system 900 may include processor 910, memory 920, storage device 930, and input/output devices 940. Some or all of the components 910, 920, 930, and 940 may be interconnected via system bus 950. Processor 910 may be single or multi-threaded and may have one or more cores. Processor 910 may execute instructions, such as those stored in memory 920 or in storage device 930. Information may be received and output using one or more input/output devices 940.

Memory 920 may store information and may be a computer-readable medium, such as volatile or non-volatile memory. Storage device 930 may provide storage for system 900 and may be a computer-readable medium. In various aspects, storage device 930 may be a flash memory device, a floppy disk device, a hard disk device, an optical disk device, or a tape device.

Input/output devices 940 may provide input/output operations for system 900. Input/output devices 940 may include a keyboard, pointing device, and microphone. Input/output devices 940 may further include a display unit for displaying graphical user interfaces, speaker, and printer. External data, such as financial data, may be stored in accessible external databases 960.

The features described may be implemented in digital electronic circuitry, or in computer hardware, firmware, software, or in combinations thereof. The apparatus may be implemented in a computer program product tangibly embodied in an information carrier, e.g., in a machine-readable storage device or in a propagated signal, for execution by a programmable processor; and method steps may be performed by a programmable processor executing a program of instructions to perform functions of the described implementations by operating on input data and generating output.

The described features may be implemented in one or more computer programs that are executable on a programmable system including at least one programmable processor coupled to receive data and instructions from, and to transmit data and instructions to, a data storage system, at least one input device, and at least one output device. A computer program may include set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors of any kind of computer. Generally, a processor may receive instructions and data from a read only memory or a random access memory or both. Such a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable, disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks may include, e.g., a LAN, a WAN, and the computers and networks forming the Internet.

The computer system may include clients and servers. A client and server may be remote from each other and interact through a network, such as the described one. The relationship of client and server may arise by virtue of computer programs running on the respective computers and having a client-server relationship to each other.

Numerous additional modifications and variations of the present disclosure are possible in view of the above teachings. It is therefore to be understood that within the scope of the appended claims, the present disclosure may be practiced other than as specifically described herein.

The invention claimed is:

1. A wireless communication device configured to communicate with a wireless communication doorbell, the wireless communication device comprising:
   a processor configured to process inbound data delivered from the wireless communication doorbell to the wireless communication device via a network device;
   a communication module configured to send outbound data to the network device, the outbound data including identifying information related to the wireless communication device and the wireless communication doorbell, such that the network device can identify the wireless communication device as being associated with the wireless communication doorbell;
   a microphone;
   a speaker;
   a male USB (Universal Serial Bus) connector configured for connecting the wireless communication device to an external power source, wherein the wireless communication device does not include an internal power source, such that the wireless communication device cannot function unless connected to an external power source; and
   a wireless data signal amplifier configured for receiving a wireless data signal transmitted from the network device associated with a first network, amplifying the wireless data signal, and then transmitting the amplified wireless data signal to another wireless communication device associated with the first network;

wherein the processor is further configured to transmit a notifying signal to the speaker in response to a ring signal received from the wireless communication doorbell via the network device;

wherein the speaker is configured to emit an audio ringtone in response to the notifying signal received from the processor; and wherein the wireless communication device further comprises a button that, when pressed in response to the audio ringtone, is configured to activate the microphone to open audio communication between a user at the wireless communication device and a visitor at the wireless communication doorbell via the network device.

2. The wireless communication device of claim 1, wherein the communication module is configured for communication via a wireless local area network (WLAN).

3. The wireless communication device of claim 1, wherein the wireless signal comprises a Wi-Fi signal.

4. The wireless communication device of claim 1, further comprising non-volatile memory configured for storing additional audio ringtones.

5. The wireless communication device of claim 1, further comprising a light-emitting component configured to receive the notifying signal from the processor and to emit light in response to the notifying signal received from the processor.

6. A method for wireless communication between a wireless communication device and a wireless communication doorbell, the wireless communication device including a processor, a communication module, a microphone, a male USB (Universal Serial Bus) connector, a wireless data signal amplifier, and a speaker, the method comprising:

the communication module sending outbound data to a network device, the outbound data including identifying information related to the wireless communication device and the wireless communication doorbell, such that the network device can identify the wireless communication device as being associated with the wireless communication doorbell;

the processor transmitting a notifying signal to the speaker in response to a ring signal received from the wireless communication doorbell via the network device;

the speaker emitting an audio ringtone in response to the notifying signal received from the processor;

the male USB (Universal Serial Bus) connector connecting the wireless communication device to an external power source, wherein the wireless communication device does not include an internal power source, such that the wireless communication device cannot function unless connected to an external power source;

the wireless data signal amplifier receiving a wireless data signal transmitted from the network device associated with a first network, amplifying the wireless data signal, and then transmitting the amplified wireless data signal to another wireless communication device associated with the first network; and the wireless communication device activating, in response to a button press occurring in response to the audio ringtone, the microphone to start audio communication between a user at the wireless communication device and a visitor at the wireless communication doorbell via the network device.

7. The method of claim 6, wherein the communication module sends the outbound data to the network device via a wireless local area network (WLAN).

8. The method of claim 6, wherein the wireless communication device further comprises non-volatile memory configured for storing additional audio ringtones.

9. The method of claim 6, wherein the wireless communication device further comprises a light-emitting component that receives the notifying signal from the processor and emits light in response to the notifying signal received from the processor.

* * * * *